June 2, 1931.   C. V. IREDELL   1,807,915
PRESSURE FORMING REFRACTORY ARTICLE
Filed Dec. 29, 1928
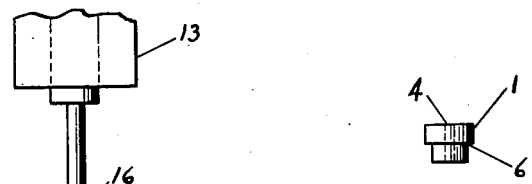
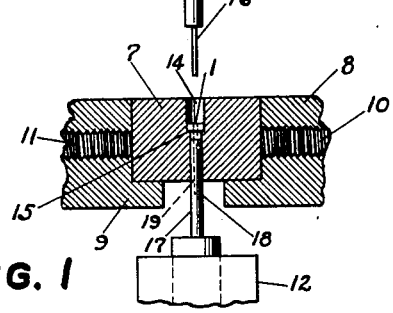
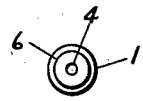
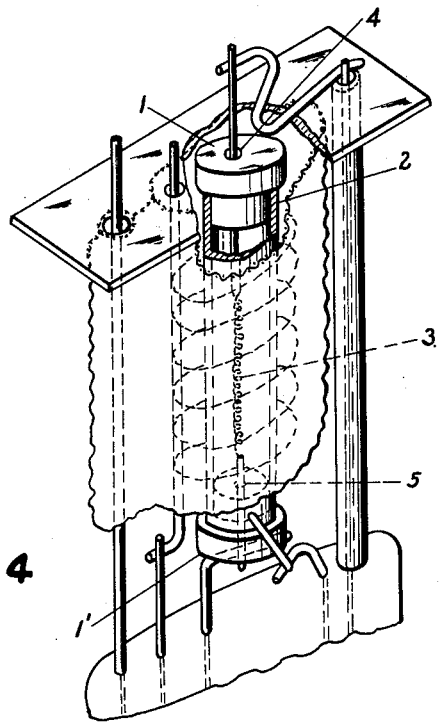
INVENTOR
C. V. IREDELL
BY
ATTORNEY Patented June 2, 1931

1,807,915

UNITED STATES PATENT OFFICE

CHARLES V. IREDELL, OF EAST ORANGE, NEW JERSEY, ASSIGNOR TO WESTINGHOUSE LAMP COMPANY, A CORPORATION OF PENNSYLVANIA

PRESSURE FORMING REFRACTORY ARTICLE

Application filed December 29, 1928. Serial No. 329,090.

This invention relates to refractory materials and more particularly relates to a method of forming refractory materials into shapes and sizes useful as support members in electron discharge devices, lamps, and similar devices.

In such devices it is necessary to employ refractory materials which are difficultly reducible and which are substantially free of deleterious impurities volatile or reducible under the conditions of operation of the device. Such materials that are useful for this purpose have been described in the art as the oxides of aluminum, magnesium, thorium, zirconium and the like; or admixtures of these oxides to form eutectic mixtures having lower sintering temperatures; or admixtures with proportionate amounts of silicon dioxide to form lower sintering eutectic mixtures; or definite chemical compounds (such as magnesium silicate, zirconium silicate, and the like compounds) having the requisite degree of chemical purity and inertness.

In the lamp or radio tube manufacturing art the size and shape of the formed refractory article together with the requisite high degree of purity and low electrical conductivity of the specific material utilized, required the development of new methods of forming, shaping and firing the refractories different than what has been heretofore practiced.

It has been customary to admix the highly purified refractory material with organic solvents such as amylacetate containing nitrocellulose until a thick paste has been obtained and thereafter form the material by mechanical shaping means such as by molding, extruding, etc., to the desired shape.

The volatile organic solvent then is permitted to evaporate and the nitrocellulose binder remaining causes the refractory article to retain its shaped size. Subsequently the dried shaped article is subjected to a sintering or firing operation during which the nitrocellulose binder is substantially driven off. The temperature of firing is sufficient to effect a sintering of the remaining substantially pure refractory material. Other similar methods have been proposed and utilized and other organic and inorganic mixtures of binders than this described have been employed.

The general methods heretofore employed have been highly undesirable for a number of reasons, chief of which is that in the method of forming with an organic or inorganic "wet" binder it is difficult to determine the exact amount of shrinkage that may be obtained on firing and to allow for this shrinkage accurately in the forming operation. As a result thereof there is usually obtained a wide variation from lot to lot and article to article in the overall dimensions. In addition thereto, the temperatures at which most of these refractory metal oxides may be sintered together when thus formed is excessive and difficult to obtain by ordinary furnace means, and an insufficient amount of sintering reduces both the cold and hot strength of the formed refractory article. In devices depending upon accuracy in dimension to retain relative spacing of parts within the device so as to obtain uniformity in operating characteristics as in radio tubes, etc., it is highly desirable to obtain a maximum degree of sintering between the refractory oxide particles and to also produce formed fired articles having a minimum of inter-dimensional variations.

In order to overcome the lack of suitable furnaces wherein temperatures may be obtained sufficient to sinter the formed highly refractory oxides it was found necessary to employ admixtures of refractory materials or to add to the relatively inert refractory oxides a proportion of a lower melting compound or eutectic mixtures which would sinter or frit together the mass at the lower available temperature to which they must be fired.

The addition of such additives to effect the sintering of the formed mass also deleteriously affects the melting point, softening point and "hot" strength of the formed article which in some devices is highly essential.

One of the objects of this invention is to provide a process of forming refractory articles whereby a minimum of dimension shrinkage is obtained on sintering the same and a maximum in consolidation and cold and hot strength obtained.

Another object of this invention is to provide a method of dry forming refractory materials.

Another object of this invention is to provide a method of forming relatively inert amorphous refractory materials into desired shape without the use of wet binder or plastic media.

Another object of this invention is to provide a process for the shaping and forming of dry amorphous solids under pressure.

Other objects and advantages may be seen as the invention is more fully disclosed.

In accordance with the objects of my invention I have discovered that by applying a suitable pressure during the shaping or forming operation the sintering or firing temperatures of the most refractory materials are reduced to within the commercially available temperatures (1550° C. to 1650° C. maximum) and that the shrinkage on firing of such formed article may be substantially eliminated or reduced within controllable limits.

I have determined that in compacting amorphous solids such as the refractory oxides, alumina, magnesia, zirconia, thoria, silica, or admixtures of these in definite or desired proportions, or in compacting refractory compounds such as the silicates, zirconium silicate, magnesium silicate, or admixture with other refractory amorphous materials; that the cohesive properties of the powdered material are extremely low and the pressure that must be employed to compact these materials into any desired shape is too high for practical commercial uses. I have found that the requisite pressure that must be applied in forming this type of material may be substantially reduced by increasing the intergranular cohesion or adhesion of such materials through the addition thereto of a suitable dry, substantially non-fluid agglutinant preferably one which is non-contaminating with respect to the refractory material and which may subsequently be entirely decomposed or volatilized by heat. I prefer to employ as an agglutinant or as a material to increase the cohesion of the refractory material, organic waxes or similar compounds which are normally solid at room temperatures but which may be flowed under pressure. Specifically I prefer to employ paraffin wax although other materials such as bees wax, gum tragacanth, gum arabic, etc. may be equally as well employed. Paraffin is cheap, substantially chemically pure and readily obtained on the market.

The general method I employ is to form a solution of the paraffin wax in an organic solvent such as ether which is subsequently readily vaporized. The refractory material such as thorium oxide, magnesium oxide, aluminum oxide or magnesium silicate, which preferably has been prefired to at least the maximum temperature at which it may subsequently be subjected and pulverized or milled to pass at least a 100 mesh screen is then admixed therewith to form a stiff paste or suspension. This admixture is allowed to dry by the evaporization of the ether solvent at room temperature and is stirred while drying to retain the individual particle size of the material and to facilitate the deposition of the paraffin upon the individual particles thereof, and is again passed through a coarse meshed screen to break up the larger particles.

The apparatus that may be employed in the pressure forming of the refractory material is dependent upon the particular refractory material employed and the size, shape and dimensions of the article to be formed and will vary widely. I may employ heavy hydraulic presses to obtain the requisite desired pressure on the large articles such as supports for the lead wires in high wattage lamps, etc. or I may employ a mechanically applied weight machine similar to that which has been heretofore utilized in the drug manufacturing industry in the forming of pills, tablets, etc., when I desire to form the smaller articles.

As a specific embodiment of the application of my invention I will describe the method I employ in forming the refractory support members utilized in the composite cathode of the insulatorless indirectly heated type such as is described in copending application Serial No. 292,116 filed 7-12-28, by J. W. Marden and E. A. Lederer and which is assigned to the same assignee as the present invention Reference should be made to the accompanying drawing wherein In Fig. 1, is shown a side elevational view partly in cross section of a typical machine for agglomerating granulated materials into desired shapes.

Fig. 2 is a side elevational view of the refractory support member magnified to three times the actual diameter.

Fig. 3 is a bottom plan view of the refractory support member. Both Figs. 2 and 3 show the overhang shoulder 6 which is designed to rest on top of nickel sleeve 2 in Fig. 4. The diameter of lower section of the refractory insulator 1 must coincide with the internal diameter of the nickel sleeve 2 in Fig. 4 and make relatively tight joindure therewith, and Fig. 4 is a perspective view of a radio tube mount to disclose the position of the refractory support members formed by the practice of the present invention.

The refractory support members 1 and 1', Fig. 4, are inserted at the top and bottom of the nickel cylinder 2, which is exteriorly coated with thermionically active material. Interiorly disposed in the cylinder 2 is shown a heater element 3 supported therein by means of lead wires extending through orifices 4 and 5 in refractory insulators 1 and 1'.

Heretofore it has been customary owing to the necessity of making these support members of constant and uniform dimensions, to form them of lava rock which may be readily machined to size. Lava rock, however, is expensive and difficult to degasify completely and moreover, the machining operation is tedious and expensive on a commercial basis.

By the practice of the present invention I am substantially enabled to form these refractory insulator support members by a combined pressure forming and sintering method which will hereinafter be more fully disclosed, and I utilize in the pressure forming operation a device such as is indicated in Fig. 1 of the accompanying drawings which is a side elevational view showing in cross section a die member 7 rigidly supported upon a base 8 and restrained against downward movement by shoulder 9 in base 8 and restrained against upward movement by frictionally engaging the sides such as by set screws 10 and 11; and also showing in position in the die member 7 the bottom plunger 12 which may be actuated to move by mechanical means not shown to move upward so as to permit end of the female extruding member 17 to take position flush with the top surface of die 7; and which also shows top plunger 13 which may be actuated to move by mechanical means not shown to move downward by mechanical means not shown to take position approximating the top surface of refractory insulator shown in cross section within the opening 14 of the die 7.

As a specific embodiment of the application of this invention I will describe the method I utilize in forming the refractory support members 1 and 1' shown in Figs. 2 and 3 from a refractory material comprised of a mixture of aluminum oxide and talc admixed in the proportion of 98% of the former to 2% of the latter.

This refractory combination is one that I have previously found to be highly satisfactory for the manufacture of insulators for the composite cathode of the indirectly heated type by the extrusion method specifically described and claimed in my copending application Serial No. 308,139 filed 9-24-28, and I have utilized the same composition in the forming of these refractory supports because it combines essentially all of the desirable properties of refractoriness, chemical inertness, low electrical conductivity, and a sintering temperature substantially within the available furnace temperature range, which yields thereby a refractory article having great physical strength.

I first form a solution of paraffin or similar wax or type material capable of increasing the cohesive properties of the refractory metal powder, in a readily volatile solvent such as ether. The usual method is to dissolve approximately 8 grams of paraffin shavings in from 200 to 400 cubic centimeters of ether.

I next prefire the aluminum oxide refractory material to approximately 1600° C. for a prolonged period of time to effect a preshrinking thereof and thereafter admix the refractory material with talc to form the preferred admixture of approximately 98% alumina and 2% talc and thereafter ball mill the same to pass a 100 mesh screen.

I next admix the above ball milled refractory material with the above solution of paraffin in ether in such proportions as to give approximately 8% (by weight) paraffin to the alumina-talc mixture. I then permit the ether wet powder to air dry with frequent stirring and facilitate the drying by placing the wet powder in a thin layer upon a smooth non-absorptive surface.

In this manner the individual particles become coated with a film of the paraffin binder which thus increases the cohesive properties of the mass. I have tried higher and lower proportions of this binder material but have found that with the above mentioned refractory material this proportion gives the best results. Other refractory materials such as thorium oxide ($ThO_2$), zirconium oxide ($ZrO_2$) etc. may require specific variations from this proportion, and it is probable that with increase in surface areas due to reduction in particle size it may be necessary to increase or decrease the specific proportions that I have set forth.

When completely air dry the refractory material should then be put through a fine mesh screen to substantially break up the large particles and thus facilitate the flow of the same under gravity feed and is then ready for the stamping or forming operation. In this operation I employ the device such as has been described and shown in Fig. 1.

The method of forming the refractory article from the above treated powdered refractory material is to first fill the opening 14 of the die 7 with the powdered refractory material with the bottom plunger 12 in the position as shown in the drawings. In commercial practice this may readily be done by a gravity feed device from a hopper such as is commonly employed in pill making machines. The upper plunger 13 is then forced in any desired manner into the opening 14 of the die and the downward movement limited by any well known device so that the desired distance indicated by the depth of the insulator shown in cross section within the die 7.

This distance may be arbitrarily set dependent upon the desired size of the formed and compacted article. In the bottom of the opening 14 in die 7 is a shoulder 15 which forms corresponding shoulder 6 upon the compacted refractory insulator shown in Fig. 2.

To form the opening 4 in the refractory insulator 1 the upper plunger 13 is provided with a male extrusion member 16 which engages an opening 19 in the female extrusion member 17 of the lower plunger 12 and may be of such diameter as to form any desired size orifice in the formed refractory insulator. The opening 19 in the female extrusion member 17 is provided at the bottom with an external orifice 18 to provide free exit for any of the refractory material that may be forced in the opening 19 of the female member 17 ahead of the male extrusion member 16 during the compacting operation.

At the conclusion of the compacting operation the male or upper plunger 13 is returned to the position indicated in the drawings and the female or bottom plunger 12 is moved upwardly until the formed refractory insulator 1 is forced out of the opening 14 in the die 7 and may be removed. The lower plunger 12 is then returned to its original position the opening 14 refilled with the refractory material and the operation repeated.

The pressure formed articles are then carefully packed in molybdenum boats and fired for approximately two hours in a hydrogen atmosphere at 1500° to 1650° C. Such fired articles will shrink in dimensional size relatively very little as compared to articles not formed by pressure and I am enabled by carefully controlling the conditions of weight of material, particle size, pressure and temperature of firing to consistently form refractory articles having a variation in dimensional measurements of not over ±1.0%.

This feature is one which is highly essential in the commercial development and use of such refractory materials.

Whereas this specific embodiment discloses the use of a mixture of aluminum oxide and talc as the refractory material, it is not to be construed that I am to be limited thereby, as I have found that I may form in this manner similar refractory articles from thorium oxide for instance alone or admixed with any desirable additional refractory material to increase or augment its various properties. I may also utilize zirconium oxide, magnesium oxide, etc. as the specific refractory material employed and I have found that the specific method of increasing the cohesive properties of such prefired oxides or other refractory materials by the addition thereto of a proportion of a material such as paraffin wax, forming said treated material under pressure and thereafter firing to temperatures up to 1650° C. substantially results in a formed fired refractory article having a low percent shrinkage and a high degree of hot and cold strength due to the increased sintering obtained therein.

Having broadly outlined the scope of my invention and broadly directed the same to the application in the pressure forming of refractory articles from substantially dry powdered refractory material it is obvious that there may be many variations in the specific embodiment that I have described without essentially departing from the nature of my invention and such departures and variations are anticipated which fall within the scope of the following claims.

What is claimed is:

1. The step in the method of forming refractory articles from powdered refractory materials which comprises augmenting the cohesive properties of the individual particles thereof prior to forming with a coating of an organic wax.

2. The step in the method of forming refractory articles from powdered refractory metal oxides which comprises superficially coating the individual particles of said material with an organic wax prior to forming.

3. The step in the method of forming refractory articles from powdered refractory metal oxides which comprises superficially coating each particle of said material with paraffin.

4. The steps in the method of forming refractory articles from powdered refractory material which comprises coating the particles of said material with an organic waxy material and shaping the dry refractory material to size by the application of pressure.

5. The steps in the method of forming refractory articles from powdered refractory metal oxides which comprises superficially coating the metal oxide particles with paraffin and thereafter shaping the coated material to size under pressure.

6. The method of forming refractory articles which comprises augmenting the natural cohesive properties of the finely divided refractory material by coating each particle thereof with an organic wax and thereafter compacting the dry coated powder to the desired size and shape.

7. The method of forming refractory articles which comprises forming a suspension of the finely divided refractory material in a solution of an organic wax, evaporating said solvent and shaping the dry doped refractory material to the desired size under pressure.

8. The method of forming refractory articles which comprises superficially coating finely divided refractory aluminum oxide, with paraffin and shaping the mixture under pressure to the desired size.

9. The method of forming refractory articles which comprises prefiring the refractory material to temperatures approximating the maximum temperature to which it subsequently may be used, finely dividing the prefired material superficially coating the finely divided material with an organic wax binder material and thereafter shaping the coated prefired finely divided material to the desired size.

10. The method of forming refractory articles such as insulators, which comprises prefiring the refractory material such as aluminum oxide to a temperature approximating 1600° C., finely pulverizing the prefired refractory oxide, adding thereto approximately 2% of talc, incorporating therein intergranularly a proportion of an organic wax such as paraffin, and thereafter shaping the doped refractory material under pressure to the desired size.

11. The method of forming refractory articles which comprises prefiring the refractory material to a temperature approximating the maximum temperature at which it may be subsequently exposed, finely pulverizing the same, superficially coating the finely divided material with a suitable proportion of paraffin, shaping the desired article therefrom under pressure, and sintering said shaped article.

12. The method of forming sintered refractory articles such as insulators, support members and the like from powdered refractory materials, which comprises prefiring said refractory materials to a temperature approximating the maximum temperature at which it may subsequently be subjected, finely pulverizing the prefired material, adding thereto intergranularly a proportion of a suitable organic wax binder, shaping said article under pressure, and firing said shaped article to elevated temperatures to effect sintering thereof.

13. The method of forming sintered refractory articles such as insulators, support members and the like from refractory metal oxides which comprises prefiring said refractory materials to temperatures approximating the maximum temperatures to which they subsequently will be subjected, finely pulverizing the prefired material, incorporating intergranularly a proportion of an organic wax such as paraffin, shaping to the desired size under pressure and firing said shaped article to elevated temperatures to effect sintering thereof.

In testimony whereof, I have hereunto subscribed my name this 28th day of December, 1928.

CHARLES V. IREDELL.